US012262136B2

(12) United States Patent
Gao et al.

(10) Patent No.: US 12,262,136 B2
(45) Date of Patent: Mar. 25, 2025

(54) PERIODIC PRESSURE FIELD MEASUREMENT SYSTEM AND METHOD BASED ON SUPERPOSED LIFETIME OF PRESSURE SENSITIVE PAINT

(71) Applicant: NORTHWESTERN POLYTECHNICAL UNIVERSITY, Shaanxi (CN)

(72) Inventors: Limin Gao, Shaanxi (CN); Ning Ge, Shaanxi (CN); Bo Ouyang, Shaanxi (CN); Lei Wang, Shaanxi (CN); Xiangfu Lei, Shaanxi (CN)

(73) Assignee: NORTHWESTERN POLYTECHNICAL UNIVERSITY, Shaanxi (CN)

( * ) Notice: Subject to any disclaimer, the term of this patent is extended or adjusted under 35 U.S.C. 154(b) by 166 days.

(21) Appl. No.: 18/181,554

(22) Filed: Mar. 10, 2023

(65) Prior Publication Data

US 2024/0121534 A1    Apr. 11, 2024

(30) Foreign Application Priority Data

Oct. 9, 2022    (CN) ......................... 202211226572.2

(51) Int. Cl.
| | |
|---|---|
| *H04N 25/773* | (2023.01) |
| *G01L 27/00* | (2006.01) |
| *H04N 25/40* | (2023.01) |
| *H04N 25/53* | (2023.01) |
| *H04N 25/711* | (2023.01) |

(52) U.S. Cl.
CPC ......... *H04N 25/773* (2023.01); *G01L 27/002* (2013.01); *H04N 25/40* (2023.01); *H04N 25/53* (2023.01); *H04N 25/711* (2023.01)

(58) Field of Classification Search
CPC ...... G01L 11/02; G01L 27/002; G01M 9/067; H04N 25/40; H04N 25/53; H04N 25/711; H04N 25/773
See application file for complete search history.

(56) References Cited

U.S. PATENT DOCUMENTS

| | | | |
|---|---|---|---|
| 2002/0112545 A1* | 8/2002 | Keathley | G01L 11/02 73/762 |
| 2013/0122301 A1* | 5/2013 | Mastrangelo | G01M 9/067 356/442 |
| 2024/0121534 A1* | 4/2024 | Gao | G01M 9/067 |

* cited by examiner

*Primary Examiner* — Amy R Hsu
(74) *Attorney, Agent, or Firm* — JCIPRNET

(57) ABSTRACT

Surface pressure measurements on rotating models are important for flow phenomenon identification, understanding flow mechanisms and model aerodynamic design. The disclosure discloses a periodic pressure field measurement system based on the superposed lifetime of pressure sensitive paint, including pressure sensitive paint, a pulse light source, a camera, a synchronizer and a computer. A lifetime superposition method is disclosed in the disclosure for measuring periodic pressure fields of pressure sensitive paint. The disclosure has the beneficial effects: the disclosure acquires, on the basis of a relationship between the fluorescence lifetime of the pressure sensitive paint and the pressure, fluorescence image pair sequence of the pressure sensitive paint with a high signal to noise ratio under a high-frequency pulsating pressure through the strobe light source and the low-frame-rate CCD camera, and obtains the global dynamic pressure distribution according to the measurement principle of the lifetime method, which can effectively reduce system errors.

9 Claims, 2 Drawing Sheets

PERIODIC PRESSURE FIELD MEASUREMENT SYSTEM AND METHOD BASED ON SUPERPOSED LIFETIME OF PRESSURE SENSITIVE PAINT

CROSS-REFERENCE TO RELATED APPLICATIONS

This application claims the priority benefit of China application no. 202211226572.2 filed on Oct. 9, 2022. The entirety of the above-mentioned patent application is hereby incorporated by reference herein and made a part of this specification.

FIELD

The present disclosure belongs to the technical field of measurement of pressure sensitive paint, and particularly relates to a periodic pressure field measurement system and method based on superposed lifetime of pressure sensitive paint.

BACKGROUND

As one of three thermotechnical parameters (pressure, temperature and flow rate) of automatic control, the pressure plays a very important role in measurement and control. There are many pressure measurement methods, but in each pressure measurement method, measurement equipment needs to be calibrated to obtain measured data, such as function relationships between an electrical signal and a pressure, and between an optical signal and a pressure, and the characteristics of the measurement system, such as sensitivity.

The optical pressure measurement with pressure sensitive paint (PSP) based on a computer vision and image processing technology is an important breakthrough in a non-contact flow visualization technology. Compared with a current domestic traditional dot matrix measurement technology, the optical measurement with pressure sensitive can make up the damage to the model and the interference to flow fields caused by hole arrangement of pressure probes, pressure sensors or the like, and the complexity of a traditional data transmission method. Moreover, this measurement greatly widens the measurement range, has the advantages of no contact, continuous measurement, relatively low experimental cost, time saving and the like, which is popular to the majority of experimental workers. The basic principle of the optical pressure sensitive measurement technology is as follows: the pressure sensitive paint uniformly covers a surface of a measured model. The pressure sensitive paint includes photosensitive molecules and an oxygen-permeable substrate. When excited by light with a specific wavelength, the photosensitive molecules in the paint obtain energy from an originally stable ground state so as to be transitioned to a high-energy-level excited state. The photosensitive molecules in the unstable excited state are impacted by oxygen molecules diffused from the measured surface to lose the energy in the excited state so as to be deactivated to return to the ground state, and no radiant light is generated in this process, so that the light intensity is lowered, resulting in an "oxygen quenching" phenomenon. The higher the concentration of the oxygen molecules, i.e., the higher the pressure in the atmosphere, the stronger the oxygen quenching effect, and the darker the light emitted by the paint under the irradiation of light with a certain wavelength. Therefore, under the irradiation of the light, the light intensity of the pressure sensitive paint can reflect a value of the pressure on the surface of the measured model. An image of the surface of the measured model is shot under the irradiation of the light, and pressure distribution on the surface of the measured model can be obtained by means of analyzing the shot image. With the development of fast PSP, this technology has expanded from the original a steady flow field measurement to the dynamic flow field measurement, especially the periodic flow field measurement. As the response time of the paint gradually shortens, the paint can be used for measuring a high-frequency fluctuating pressure field.

However, in the prior art, the pressure measurement with fast PSP mainly has the following problems:

With an increasing frequency of measuring the pressure of a flow field, it is required that the exposure time of a camera is shortened to meet the requirement for measuring high-frequency pressure field measurement. However, when the exposure time of the camera is shortened, it will directly lead to a decline in the light input of the camera, resulting in a low signal to noise ratio (SNR) of a fluorescent image shot by the camera, and reducing the accuracy of pressure calibration for the PSP, which is unfavorable for obtaining high-resolution pressure measurement results. A filter in a measurement system is mainly used for filtering out light emitted by a light source. However, the PSP is a weak light technology due to its low excitation degree. However, the filter has a limited light filtering effect and cannot completely filter out the light intensity from the light source. As a result, the final image contains both a light emitting component of the PSP and the light emitting component of the light source, which cannot be eliminated by subsequent image processing technology and the data processing technology, resulting in low signal to noise ratios of the measurement results.

SUMMARY

The present disclosure aims to provide a periodic pressure field measurement system and method based on the superposed lifetime of pressure sensitive paint for the shortcoming in the prior art.

The present disclosure adopts the technical solutions adopted as follows: A periodic pressure field measurement system based on the superposed lifetime of pressure sensitive paint includes a test piece, a pulse light source, a camera, a synchronizer and a computer. A test surface of the test piece is uniformly sprayed with pressure sensitive paint. The pulse light source directly faces the test surface of the test piece, and is connected to the synchronizer. The camera is fixed above the pulse light source. A lens of the camera is aligned with the test surface of the test piece, and the test surface of the test piece is completely in the range of the lens of the camera. The camera is connected to the synchronizer and the computer respectively.

According to the above-mentioned solution, the camera is a CCD camera.

According to the above-mentioned solution, the pulse light source is centered relative to the test surface.

The present disclosure further provides a periodic pressure field measurement method based on the superposed lifetime of pressure sensitive paint. The method includes the following steps:

step 1, providing the respective components of the above-mentioned periodic pressure field measurement system of the pressure sensitive paint;

step 2, uniformly spraying the pressure sensitive paint onto the test surface of the test piece;

step 3, enabling the pulse light source to directly face the test surface of the test piece, mounting the camera above the pulse light source, and aligning the lens of the camera with the test surface of the test piece;

step 4, enabling a modulation mode of the camera, and uniformly dividing a pressure field with a period of T into n parts in time, wherein a phase corresponding to a pressure field within an ith time period is $\varphi_i$, and phases corresponding to pressure fields within respective time periods are respectively $\varphi_1, \varphi_2 \ldots \varphi_n$;

step 5, placing the periodic pressure field measurement system of the pressure sensitive paint in a lightless environment for experiment, and starting to measure a pressure field of the PSP after an experimental pressure field satisfies periodic changes;

step 6, adjusting the pulse light source by using the synchronizer to enable a pulse emitted by the pulse light source to have a width of tp and the number of light emissions under phase $\varphi_1$ to be M;

step 7, controlling, by the computer, the camera via the synchronizer to enable the camera to shoot images after the pulse light source emits light for tp; selecting the modulation mode of the camera, setting the frequency of the modulation mode to be M, setting the single exposure time of the camera to be t1, accommodating M light emitting lifetimes of the PSP within t1 in the modulation mode, recording the lifetimes by the computer, and outputting an image I1;

step 8, performing delay setting on the camera to enable the camera to start exposure after the pulse light source emits light for tp+t1; selecting the modulation mode of the camera, setting the frequency of the modulation mode to be M, setting the exposure time to be t2, accumulating M light emitting lifetimes of the PSP within t2 in the modulation mode, recording the lifetimes by the computer, and outputting an image I2;

step 9, dividing, by the computer, gray values of the same pixels of the image I1 and the image I2 to obtain an image I1/I2, and then restoring pressure information of the phase $\varphi_1$ according to an image light intensity and pressure calibration formula of the PSP; and step 10, adjusting the pulse light source to emit light in other phases by using the synchronizer according to a time-space relationship between the periodicity of a pressure field and the phase, and repeating steps 6 to 9 to obtain pressure change processes at n moments within one period, thus realizing dynamic pressure measurement.

According to the above-mentioned solution, the modulation mode refers to that the camera can control the photosensitive start and stop time of a photosensitive chip of the camera for multiple times through an external trigger signal during exposure; after receiving photons each time, the photosensitive chip converts the photons into electric signals that are accumulated in a memory; and after the exposure ends, the accumulated signals are combined and converted into the gray value of the image.

According to the above-mentioned solution, in step 9, the image light intensity and pressure calibration formula is $$\frac{Iref1/Iref2}{I1/I2} = A + B\frac{P}{Pref},$$

wherein A and B are calibration coefficients, Pref is a reference pressure, and Iref1 and Iref2 are respectively two images obtained by the method of lifetime superposition of the pressure sensitive paint under the reference pressure. The calibration coefficients are determined in a calibration bin. Pressure P is repeatedly adjusted to obtain a series of linear equations related to A and B, and A and B are finally determined by means of the least square method. The pressure information can be restored through the formula.

The present disclosure has the beneficial effects below.

In the present disclosure, on the basis of the relationship between the fluorescence lifetime of the pressure sensitive paint and the pressure, the fluorescence image pair sequence of the pressure sensitive paint with a high signal to noise ratio under high-frequency pulsating pressure is acquired through the strobe light source and the low-frame-rate CCD camera, and an the global dynamic pressure distribution is obtained according to the measurement principle of the lifetime method, which can effectively reduce system errors. By means of time sequence control, light emission of the light source is avoided. Compared with a traditional measurement system, the present disclosure does not need to filter out light emitted by the light source through the filter, and the shot image only contains light emitted by PSP, thus improving the signal to noise ratio of the PSP.

DETAILED DESCRIPTION OF THE EMBODIMENTS

In order to better understand the present disclosure, the present disclosure is further described below in conjunction with the accompanying drawings and specific embodiments.

Figure 1:
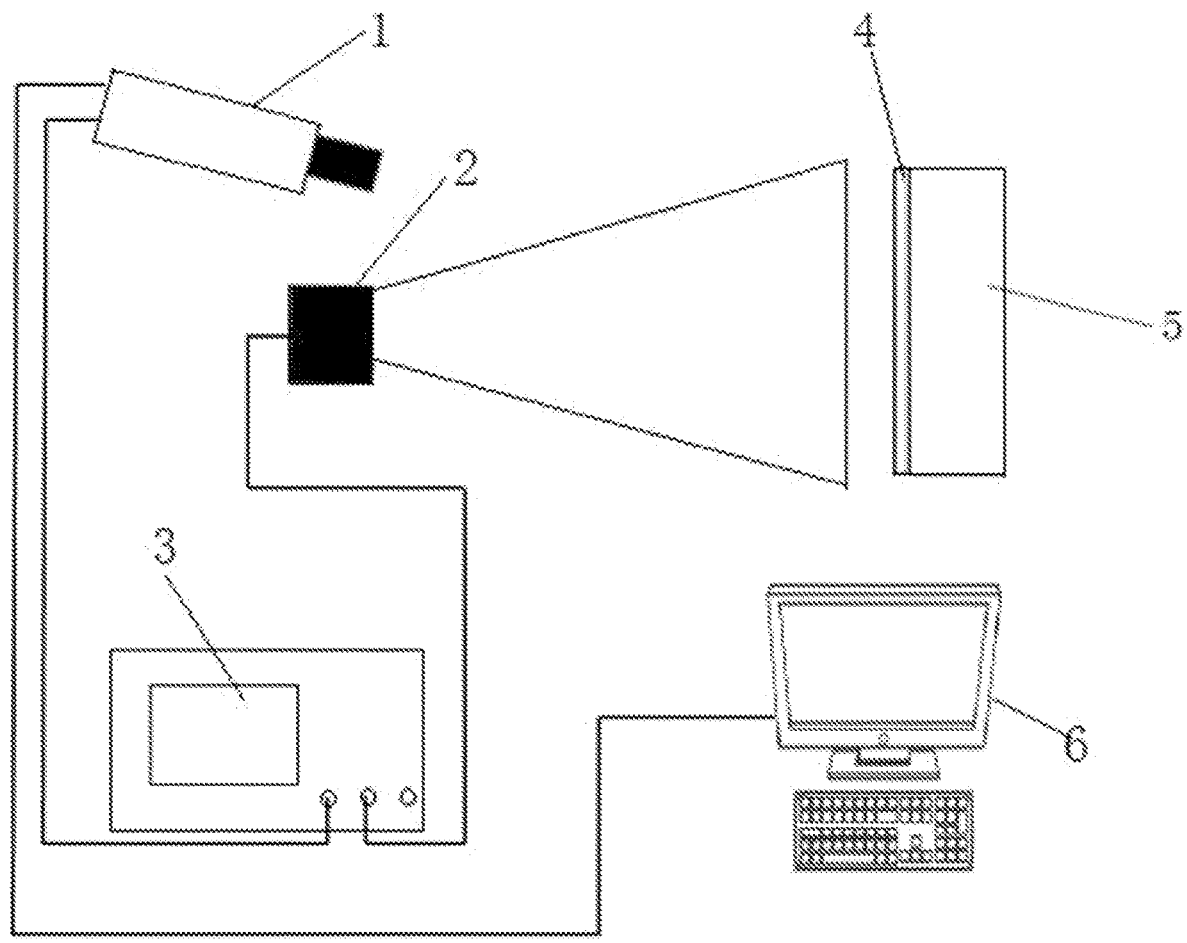
FIG. 1 is a structural schematic diagram of a specific embodiment of the present disclosure.

As shown in FIG. 1, a periodic pressure field measurement system based on the superposed lifetime of pressure sensitive paint includes a test piece 5, a pulse light source 2, a camera 1, a synchronizer 3 and a computer 6. A test surface of the test piece 5 is uniformly sprayed with pressure sensitive paint (hereinafter referred to as PSP 4). The pulse light source 2 directly faces the test surface of the test piece 5. The pulse light source 2 is connected to the synchronizer 3. The camera 1 is fixed above the pulse light source 2. A lens of the camera 1 is aligned with the test surface of the test piece 5, and the test surface of the test piece 5 is completely in the range of the lens of the camera 1. The camera 1 is connected to the synchronizer 3 and the computer 6 respectively.

In the embodiment, the camera 1 is a CCD camera. The pulse light source 2 directly faces the test surface of the test piece 5, and is centered relative to the test surface.

In the present disclosure, the pulse light source 2 is used for emitting light to the test surface of the test piece 5. The camera 1 is used for shooting images. The function of the synchronizer 3 is to control a light emitting time sequence of the pulse light source 2 and control a pulse width of the pulse light source 2. The computer 6 is used for controlling parameters of the camera 1 and saving image data.

A periodic pressure field measurement method based on the superposed lifetime of pressure sensitive paint includes the following steps:

Step 1, the respective components of the above-mentioned periodic pressure field measurement system of the pressure sensitive paint are provided.

Step 2, the pressure sensitive paint is uniformly sprayed onto the test surface of the test piece 5.

Step 3, the pulse light source 2 directly faces the test surface of the test piece 5 to ensure that uniform irradiation of the pulse light source. The camera 1 is mounted above the pulse light source 2, and the lens of the camera 1 is aligned with the test surface of the test piece 5.

Step 4, a modulation mode of the camera 1 is enabled. In order to capture dynamic changes of a pressure field, a pressure field with a period of T is uniformly divided into n parts in time, wherein a phase corresponding to a pressure field within an ith time period is φi, and phases corresponding to pressure fields within respective time periods are respectively $\varphi_1, \varphi_2 \ldots \varphi_n$.

In the present disclosure, the modulation mode of the camera 1 refers to that the camera 1 can control the photosensitive start and stop time of a photosensitive chip of the camera 1 for multiple times through an external trigger signal during exposure; after receiving photons each time, the photosensitive chip converts the photons into electric signals that are accumulated in a memory; and after the exposure ends, the accumulated signals are combined and converted into the gray value of an image.

Figure 2:
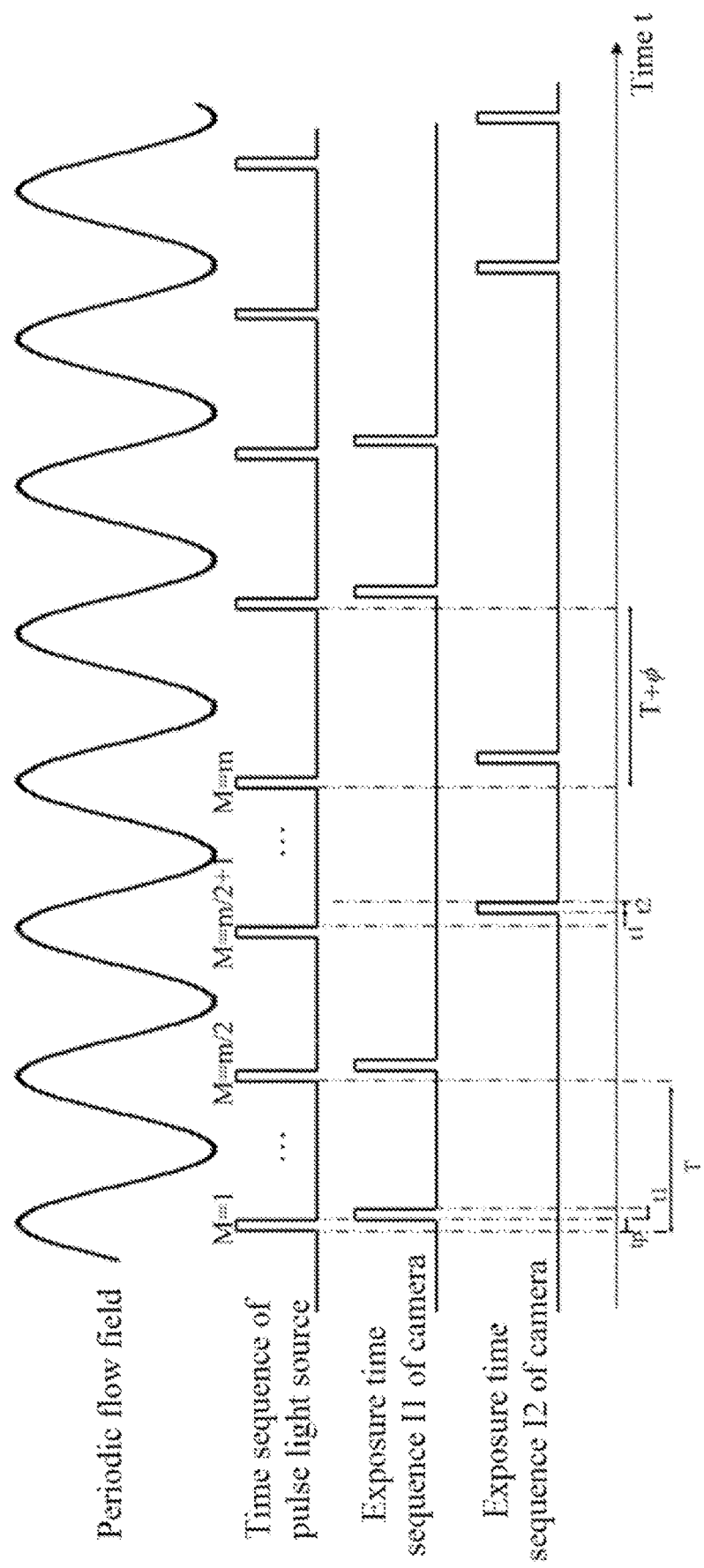
FIG. 2 is a schematic diagram of time sequence control of a camera in the embodiment. 1, camera; 2, pulse light source; 3, synchronizer; 4, PSP; 5, test piece; and 6, computer.

Step 5, the periodic pressure field measurement system of the pressure sensitive paint is placed in a lightless environment for experiment. After an experimental pressure field satisfies periodic changes, a pressure field of the PSP 4 starts to be measured. A periodic pressure field is as shown in FIG. 2.

In the present disclosure, the lightless environment refers to that the camera 1 respectively shoots images respectively in both cases of opening and closing a lens cover, and the exposure time is 1 min; and when the two images have the same gray values, it is considered that the environment is lightless.

Step 6, the pulse light source 2 is adjusted by using the synchronizer 3 to enable a pulse emitted by the pulse light source to have a width of tp (about 1 ms during which the PSP 4 is excited to be in a strongest light emitting state) and to enable the number of light emissions under phase φ1 to be M. The time sequence of the pulse light source is as shown in FIG. 2.

In the present disclosure, a method for determining the number M of light emissions includes: ensuring the number of light emissions when the gray value of the image is close to the gray value corresponding to the full well capacity of the camera; and after the number of light emissions is determined, keeping the number of light emissions unchanged for acquisition of all images.

Step 7, the computer 6 controls the camera 1 through the synchronizer 3 to enable the camera 1 to shoot images after the pulse light source 2 emits light for tp, which ensures that the camera 1 shields light emitted by the pulse light source 2 when there is no filter. The modulation mode of the camera 1 is selected (that is, the camera 1 can control the photosensitive start and stop time of the photosensitive chip for multiple times through an external trigger signal during exposure; after receiving photons each time, the photosensitive chip converts the photons into electric signals that are accumulated in a memory; and after the exposure ends, the accumulated signals are combined and converted into a gray value of an image). The frequency of the modulation mode is set to be M. The single exposure time of the camera 1 is set to be t1. M light emitting lifetimes of the PSP 4 within t1 are accumulated in the modulation mode. The lifetimes are recorded by the computer 6. An image I1 is output. The exposure time sequence I1 of the camera 1 is as shown in FIG. 2.

Step 8, delay setting is performed on the camera 1 to enable the camera 1 to start exposure after the pulse light source 2 emits light for tp+t1. The modulation mode of the camera 1 is selected. The frequency of the modulation mode is set to be M, and the exposure time is set to be t2. M light emitting lifetimes of the PSP 4 within t2 are accumulated in the modulation mode. The lifetimes are recorded by the computer 6. An image I2 is output. The exposure time sequence I2 of the camera 1 is as shown in FIG. 2.

Step 9, the computer divides gray values of the same pixels of the image I1 and the image I2 to obtain an image I1/I2, and then pressure information of the phase $\varphi_1$ is restored according to an image light intensity and pressure calibration formula of the PSP 4.

In the present disclosure, the image light intensity and pressure calibration formula is $$\frac{Iref1/Iref2}{I1/I2} = A + B\frac{P}{Pref},$$

wherein A and B are calibration coefficients, Pref is a reference pressure, and Iref1 and Iref2 are respectively two images obtained by the method of lifetime superposition of the pressure sensitive paint under the reference pressure. The calibration coefficients are determined in a calibration bin. Pressure P is repeatedly adjusted to obtain a series of linear equations related to A and B, and A and B are finally determined by means of the least square method. The pressure information can be restored through the formula.

$$\frac{Iref1/Iref2}{I1/I2}$$

and Pref can be obtained in experiments.

Step 10, the synchronizer 3 is used to adjust the pulse light source 2 to emit light in other phases according to a time-space relationship between the periodicity of a pressure field and the phase, and steps 6 to 9 are repeated to obtain pressure change processes at n moments within one period, thus realizing dynamic pressure measurement.

In the present disclosure, the single exposure time t1 and the single exposure time t2 of the camera 1 are both determined according to the characteristics of the PSP 4.

Finally, it should be noted that the above descriptions are only preferred embodiments of the present disclosure and are not intended to limit the present disclosure. Although the present disclosure has been described in detail with reference to the embodiments, those skilled in the art still can modify the technical solutions disclosed in the in the respective foregoing embodiments, or equivalently substitute parts of technical features therein. However, any modifications, equivalent replacements, improvements and the like that are made within the spirit and principle of the present disclosure shall all fall within the protection scope of the present disclosure.

What is claimed is:

1. A periodic pressure field measurement method based on a superposed lifetime of pressure sensitive paint, comprising the following steps:

step 1, providing respective components of a periodic pressure field measurement system of the pressure sensitive paint, wherein the periodic pressure field measurement system comprises: a test piece, a pulse light source, a camera, a synchronizer and a computer, wherein a test surface of the test piece is uniformly sprayed with the pressure sensitive paint (PSP); the pulse light source directly faces the test surface of the test piece and is centered relative to the test surface; the pulse light source is connected to the synchronizer; the camera is fixed above the pulse light source; a lens of the camera is aligned with the test surface of the test piece, and the test surface of the test piece is completely in the range of the lens of the camera; and the camera is connected to the synchronizer and the computer respectively;

step 2, uniformly spraying the pressure sensitive paint onto the test surface of the test piece;

step 3, enabling the pulse light source to directly face the test surface of the test piece, mounting the camera above the pulse light source, and aligning the lens of the camera with the test surface of the test piece;

step 4, enabling a modulation mode of the camera, and uniformly dividing a pressure field with a period of T into n parts in time, wherein a phase corresponding to a pressure field within an ith time period is $\varphi_i$, and phases corresponding to pressure fields within respective time periods are respectively $\varphi_1, \varphi_2 \ldots \varphi_n$;

step 5, placing the periodic pressure field measurement system of the pressure sensitive paint in a lightless environment for experiment, and starting to measure a pressure field of the PSP after an experimental pressure field satisfies periodic changes;

step 6, adjusting the pulse light source by using the synchronizer to enable a pulse emitted by the pulse light source to have a width of tp and to enable the number of light emissions under phase $\varphi_1$ to be M;

step 7, controlling, by the computer, the camera via the synchronizer to enable the camera to shoot images after the pulse light source emits light for tp; selecting the modulation mode of the camera, setting the frequency of the modulation mode to be M, setting the single exposure time of the camera to be t1, accommodating M light emitting lifetimes of the PSP within t1 in the modulation mode, recording the lifetimes by the computer, and outputting an image I1;

step 8, performing delay setting on the camera to enable the camera to start exposure after the pulse light source emits light for tp+t1; selecting the modulation mode of the camera, setting the frequency of the modulation mode to be M, and setting the exposure time to be t2; accumulating M light emitting lifetimes of the PSP within t2 in the modulation mode, recording the lifetimes by the computer, and outputting an image I2;

step 9, dividing, by the computer, gray values of the same pixels of the image I1 and the image I2 to obtain an image I1/I2, and then restoring pressure information of the phase $\varphi_1$ according to an image light intensity and pressure calibration formula of the PSP; and step 10, adjusting the pulse light source to emit light in other phases by using the synchronizer according to a time-space relationship between the periodicity of a pressure field and the phase, and repeating steps 6 to 9 to obtain pressure change processes at n moments within one period, thus realizing dynamic pressure measurement.

2. The periodic pressure field measurement method according to claim 1, wherein the modulation mode refers to that the camera can control the photosensitive start and stop time of a photosensitive chip of the camera for multiple times through an external trigger signal during exposure; after receiving photons, the photosensitive chip converts the photons into electric signals that are accumulated in a memory; and after the exposure ends, the accumulated signals are combined and converted into the gray value of the image.

3. The periodic pressure field measurement method according to claim 1, wherein in step 9, the image light intensity and pressure calibration formula is $$\frac{Iref1/Iref2}{I1/I2} = A + B\frac{P}{Pref},$$

wherein A and B are calibration coefficients, Pref is a reference pressure, and Iref1 and Iref2 are respectively two images obtained by the method of lifetime superposition of the pressure sensitive paint under the reference pressure; the calibration coefficients are determined in a calibration bin; pressure P is repeatedly adjusted to obtain a series of linear equations related to A and B; A and B are finally determined by means of the least square method; and pressure information can be restored through the formula.

4. A periodic pressure field measurement method based on a superposed lifetime of pressure sensitive paint, comprising the following steps:

step 1, providing respective components of a periodic pressure field measurement system of the pressure sensitive paint, wherein the periodic pressure field measurement system comprises: a test piece, a pulse light source, a camera, a synchronizer and a computer, wherein a test surface of the test piece is uniformly sprayed with the pressure sensitive paint (PSP); the pulse light source directly faces the test surface of the test piece and is centered relative to the test surface; the pulse light source is connected to the synchronizer; the camera is fixed above the pulse light source; a lens of the camera is aligned with the test surface of the test piece, and the test surface of the test piece is completely in the range of the lens of the camera; and the camera is connected to the synchronizer and the computer respectively, wherein the camera is a CCD camera;

step 2, uniformly spraying the pressure sensitive paint onto the test surface of the test piece;

step 3, enabling the pulse light source to directly face the test surface of the test piece, mounting the camera above the pulse light source, and aligning the lens of the camera with the test surface of the test piece;

step 4, enabling a modulation mode of the camera, and uniformly dividing a pressure field with a period of T into n parts in time, wherein a phase corresponding to a pressure field within an ith time period is $\varphi_i$, and phases corresponding to pressure fields within respective time periods are respectively $\varphi_1, \varphi_2 \ldots \varphi_n$;

step 5, placing the periodic pressure field measurement system of the pressure sensitive paint in a lightless environment for experiment, and starting to measure a pressure field of the PSP after an experimental pressure field satisfies periodic changes;

step 6, adjusting the pulse light source by using the synchronizer to enable a pulse emitted by the pulse light source to have a width of tp and to enable the number of light emissions under phase $\varphi_1$ to be M;

step 7, controlling, by the computer, the camera via the synchronizer to enable the camera to shoot images after the pulse light source emits light for tp; selecting the modulation mode of the camera, setting the frequency of the modulation mode to be M, setting the single exposure time of the camera to be t1, accommodating M light emitting lifetimes of the PSP within t1 in the modulation mode, recording the lifetimes by the computer, and outputting an image I1;

step 8, performing delay setting on the camera to enable the camera to start exposure after the pulse light source emits light for tp+t1; selecting the modulation mode of the camera, setting the frequency of the modulation mode to be M, and setting the exposure time to be t2; accumulating M light emitting lifetimes of the PSP within t2 in the modulation mode, recording the lifetimes by the computer, and outputting an image I2;

step 9, dividing, by the computer, gray values of the same pixels of the image I1 and the image I2 to obtain an image I1/I2, and then restoring pressure information of the phase $\varphi_1$ according to an image light intensity and pressure calibration formula of the PSP; and step 10, adjusting the pulse light source to emit light in other phases by using the synchronizer according to a time-space relationship between the periodicity of a pressure field and the phase, and repeating steps 6 to 9 to obtain pressure change processes at n moments within one period, thus realizing dynamic pressure measurement.

5. The periodic pressure field measurement method according to claim 4, wherein the modulation mode refers to that the camera can control the photosensitive start and stop time of a photosensitive chip of the camera for multiple times through an external trigger signal during exposure; after receiving photons, the photosensitive chip converts the photons into electric signals that are accumulated in a memory; and after the exposure ends, the accumulated signals are combined and converted into the gray value of the image.

6. The periodic pressure field measurement method according to claim 4, wherein in step 9, the image light intensity and pressure calibration formula is $$\frac{Iref1/Iref2}{I1/I2} = A + B\frac{P}{Pref},$$

wherein A and B are calibration coefficients, Pref is a reference pressure, and Iref1 and Iref2 are respectively two images obtained by the method of lifetime superposition of the pressure sensitive paint under the reference pressure; the calibration coefficients are determined in a calibration bin; pressure P is repeatedly adjusted to obtain a series of linear equations related to A and B; A and B are finally determined by means of the least square method; and pressure information can be restored through the formula.

7. A periodic pressure field measurement method based on a superposed lifetime of pressure sensitive paint, comprising the following steps:

step 1, providing respective components of a periodic pressure field measurement system of the pressure sensitive paint, wherein the periodic pressure field measurement system comprises: a test piece, a pulse light source, a camera, a synchronizer and a computer, wherein a test surface of the test piece is uniformly sprayed with the pressure sensitive paint (PSP); the pulse light source directly faces the test surface of the test piece and is centered relative to the test surface; the pulse light source is connected to the synchronizer; the camera is fixed above the pulse light source; a lens of the camera is aligned with the test surface of the test piece, and the test surface of the test piece is completely in the range of the lens of the camera; and the camera is connected to the synchronizer and the computer respectively, wherein the pulse light source is centered relative to the test surface;

step 2, uniformly spraying the pressure sensitive paint onto the test surface of the test piece;

step 3, enabling the pulse light source to directly face the test surface of the test piece, mounting the camera above the pulse light source, and aligning the lens of the camera with the test surface of the test piece;

step 4, enabling a modulation mode of the camera, and uniformly dividing a pressure field with a period of T into n parts in time, wherein a phase corresponding to a pressure field within an ith time period is $\varphi_i$, and phases corresponding to pressure fields within respective time periods are respectively $\varphi_1, \varphi_2 \ldots \varphi_n$;

step 5, placing the periodic pressure field measurement system of the pressure sensitive paint in a lightless environment for experiment, and starting to measure a pressure field of the PSP after an experimental pressure field satisfies periodic changes;

step 6, adjusting the pulse light source by using the synchronizer to enable a pulse emitted by the pulse light source to have a width of tp and to enable the number of light emissions under phase $\varphi_1$ to be M;

step 7, controlling, by the computer, the camera via the synchronizer to enable the camera to shoot images after the pulse light source emits light for tp; selecting the modulation mode of the camera, setting the frequency of the modulation mode to be M, setting the single exposure time of the camera to be t1, accommodating M light emitting lifetimes of the PSP within t1 in the modulation mode, recording the lifetimes by the computer, and outputting an image I1;

step 8, performing delay setting on the camera to enable the camera to start exposure after the pulse light source emits light for tp+t1; selecting the modulation mode of the camera, setting the frequency of the modulation mode to be M, and setting the exposure time to be t2; accumulating M light emitting lifetimes of the PSP within t2 in the modulation mode, recording the lifetimes by the computer, and outputting an image I2;

step 9, dividing, by the computer, gray values of the same pixels of the image I1 and the image I2 to obtain an image I1/I2, and then restoring pressure information of the phase $\varphi_1$ according to an image light intensity and pressure calibration formula of the PSP; and step 10, adjusting the pulse light source to emit light in other phases by using the synchronizer according to a time-space relationship between the periodicity of a pressure field and the phase, and repeating steps 6 to 9 to obtain pressure change processes at n moments within one period, thus realizing dynamic pressure measurement.

8. The periodic pressure field measurement method according to claim 7, wherein the modulation mode refers to that the camera can control the photosensitive start and stop time of a photosensitive chip of the camera for multiple times through an external trigger signal during exposure; after receiving photons, the photosensitive chip converts the photons into electric signals that are accumulated in a memory; and after the exposure ends, the accumulated signals are combined and converted into the gray value of the image.

9. The periodic pressure field measurement method according to claim 7, wherein in step 9, the image light intensity and pressure calibration formula is $$\frac{Iref1/Iref2}{I1/I2} = A + B\frac{P}{Pref},$$

wherein A and B are calibration coefficients, Pref is a reference is pressure, and Iref1 and Iref2 are respectively two images obtained by the method of lifetime superposition of the pressure sensitive paint under the reference pressure; the calibration coefficients are determined in a calibration bin; pressure P is repeatedly adjusted to obtain a series of linear equations related to A and B; A and B are finally determined by means of the least square method; and pressure information can be restored through the formula.

* * * * *